Figure 1:
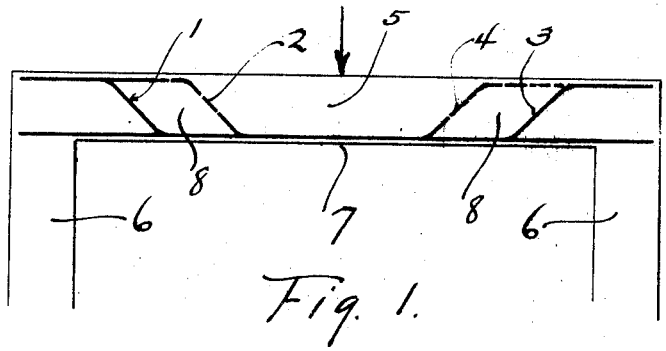

D. B. LUTEN.
BEAM.
APPLICATION FILED NOV. 28, 1910.

1,089,487.

Patented Mar. 10, 1914.

UNITED STATES PATENT OFFICE.

DANIEL B. LUTEN, OF INDIANAPOLIS, INDIANA.

BEAM.

1,089,487.  Specification of Letters Patent.  Patented Mar. 10, 1914.

Application filed November 28, 1910. Serial No. 594,483.

*To all whom it may concern:*

Be it known that I, DANIEL B. LUTEN, a citizen of the United States, residing at Indianapolis, in the county of Marion and State of Indiana, have invented a new and useful Improvement in Beams, of which the following is a specification.

My invention relates to improvements in reinforcement for concrete beams whereby the beams are not only strengthened without increased material but are also cheapened in cost by reason of greater facility of construction.

The invention is illustrated in the accompanying drawings in which the same reference characters designate like parts throughout the several views, and in which—

Figure 2:
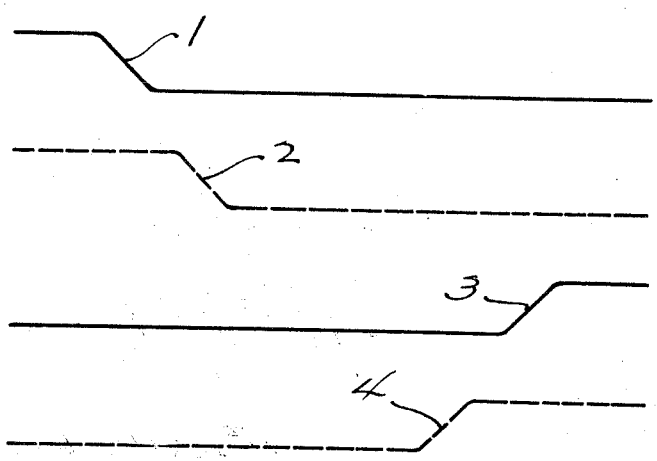

Figure 1 is a longitudinal section through a beam and its supports, and Fig. 2 is a detail view of the reinforcing members.

A concrete beam requires reinforcement throughout all the tension regions induced by any possible arrangement of loading. The loaded surface of the beam will have no tension regions unless the beam has fixed ends in which case tension regions will occur above the supports. But the unloaded surface of the beam will have tension throughout most of the span, and reaching its greatest values near the middle of the span. There will also be areas of diagonal tension extending through the thickness of the beam for perhaps one fourth of the span from each support.

A reinforcing member such as 1 in Fig. 2, when embedded in the beam 5 as shown in Fig. 1, will reinforce the tension regions throughout most of the unloaded surface, and by passing diagonally upward through the beam as at 1, will reinforce in part the area of diagonal tension and may also extend through a region of tension over the support 6 although this feature is useful for tension only in case the beam be continuous or have fixed ends. A short extension at the end of the diagonal would be useful for anchorage in any event. If now this bar be combined with such a bar as 3 of Fig. 2, of identical form but reversed in position, in the beam of Fig. 1, the unloaded face 7 of the beam will be reinforced throughout and with maximum reinforcement near the middle of the span where it is desirable since the weight of the beam and the applied loads produce maximum tension in that region. This pair of reinforcing members may be combined with another pair of members as 2 and 4 of Fig. 2, similar except that the diagonals cross the beam at different points, thus distributing the diagonal reinforcing members throughout the diagonal tension regions 8 as at 1, 2, 3, and 4. The combining of the four rods as shown in Fig. 1 thus results in a beam reinforced throughout all possible tension regions, and with the unloaded surface reinforced with two rods near the support, with three rods at about the quarter span and with four rods at the middle of the span, the reinforcement thus increasing with the tension. The diagonal tension regions are also reinforced with distributed tension members. And by multiplying the number of reinforcing members, any degree of distribution that may be desired may be had for the diagonal tension regions at the same time that the variation from minimum to maximum reinforcement in the unloaded face may be made to suit the degree of tension.

All of the four reinforcing members may be made identical in form and still be combined to perform the above function with the advantage that but one lay-out plan for the bending of the reinforcement need be shown on the drawing, and resulting in great simplicity of reinforcement required for the complete structure.

I claim;—

1. A beam reinforced with embedded tension members, each of said members following the unloaded face of the beam closely near one end and along the middle of the beam and crossing the beam near the opposite end of the beam, two of said members being substantially identical but longitudinally reversed in the beam; and two others of said members being similarly arranged but crossing the beam nearer the center of the beam than are the points of crossing of the first two members, corresponding ends of all said members being substantially in the same vertical planes.

2. A beam of hardened plastic embodying two series of embedded tension members the tension members of both series being substantially identical in effective length with their corresponding ends substantially in the same vertical planes and each member of each series comprising two substantially parallel portions of different lengths connected by an intermediate inclined portion, the initial ends of the several members of a series differing in length whereby the inclined intermediate connecting portions may be distributed along the length of the beam, and the members of one series being arranged opposite to the members of the other series.

3. In combination, a beam of hardened plastic, and a plurality of tension members embedded in said beam and each comprising two substantially parallel end portions respectively near the upper and lower surfaces of the beam and joined by an intermediate oblique portion, some of said tension members being longitudinally reversed in position with respect to others and some having their oblique portions nearer the elevated ends than have others, the elevated end portions being over the beam supports with their ends all substantially in the same vertical planes.

4. A beam reinforced with embedded tension members, in two sets, each of said members having a portion adjacent the middle part of the unloaded face of the beam and a diagonal portion crossing the beam at one end only of said first named portion and an end portion projecting from the end of the diagonal portion, the end portions on the two sets being of unequal length and closely following the loaded face of the beam, said reinforcing members being reversely embedded in pairs so that the diagonal portions cross the beam at different distances from the middle of the span.

5. A beam reinforced with embedded tension members, in two sets, the members of each set all being substantially identical, each of said members comprising a portion adjacent the unloaded face of the beam from one end of the beam to a point on the opposite side of the center of the beam and a diagonal portion extending from said last named end of the first portion across the beam toward the loaded face of the beam and an end portion extending from the diagonal portion and located adjacent the loaded face of the beam, some of the reinforcing members of each set being reversed with respect to other members of said set, and the first named portions of the two sets being of different lengths, so that the diagonal portions cross the beam on both sides of the center thereof at different distances from such center.

6. A beam reinforced with embedded tension members, in two sets, the members of each set all being substantially identical, each of said members comprising a portion adjacent the unloaded face of the beam from one end of the beam to a point on the opposite side of the center of the beam and a diagonal portion extending from said last named end of the first portion across the beam toward the loaded face of the beam, some of the reinforcing members of each set being reversed with respect to other members of said set, and the first named portions of the two sets being of different lengths, so that the diagonal portions cross the beam on both sides of the center thereof at different distances from such center.

7. A reinforcing for concrete beams, comprising a set of substantially identical tension members, each nonsymmetrical on opposite sides of its center, said members being turned end for end with respect to one another and each arranged to cross the beam diagonally near one end and to follow one face of the beam closely near the middle of the beam, and a second set of substantially identical tension members, each nonsymmetrical on opposite sides of its center, said members of said second set also being turned end for end with respect to one another and each arranged to cross the beam diagonally near one end and to follow one face of the beam closely near the middle of the beam, the tension members of said two sets differing from each other in having their diagonal portions at different distances from the centers of the members.

In witness whereof, I have hereunto set my hand and seal at Indianapolis, Indiana, this 16th day of November, A. D. one thousand nine hundred and ten.

DANIEL B. LUTEN. [L. S.]

Witnesses:
 FRANK A. FAHLE,
 ARTHUR M. HOOD.

Copies of this patent may be obtained for five cents each, by addressing the "Commissioner of Patents, Washington, D. C."